(12) United States Patent
Parker

(10) Patent No.: X1038
(45) Date of Patent: Apr. 26, 1809

(54) CURRYING & FINISHING LEATHER

(76) Inventor: Samuel Parker

Samuel Parker.
Letters Patent
[illegible] July 9. [illegible]

The Schedule refer'd to in these Letters Patent & making part of the same, containing a description in the words of the said Samuel Parker himself, of his mode of currying and finishing leather of all kinds - - .

---

This consists in extending, smoothing, consolidating, splitting, scouring, cutting, crumping, oiling, stuffing, stamping, or printing, blacking, sizing, slicking, stri-ping, polishing, glazing or finishing; - which is performed by a machine or ma-chines contained in a frame; the size of which may be according to the work. That is to say, if whole hides are intended to be don at one operation, in each part of the finishing, the frame of the machine must be as wide as the hide and the rollers or nuts and all the parts of the machine: must be proportioned to the size of the frame, but, the whole work may be performed equally as well, by a frame six feet wide and six and half high in the clear by making the ends of the rollers or nuts and beam smaller; to admit the outer sides of the skins to be doubled while the single part only passes between the rollers and nuts and beam - repeating the same and performing a part at a time. The frame if larger or smaller will alter the proportion only not the construction or prin-ciple of the machine which consist principally of a certain number of rollers, to perform the different parts of the work; all at the same time, placed in differents parts, and although an horizontal position hath been preserved, it is not a matter of consequence: as the rollers may be placed in any position or number, the constructor pleases, that will perform the works The different sets of rollers, are for different work, and may generally be placed as the first. The number proportion and movement being nearly the same. Two large and one small, the small one in the centre, placed horizontally, to be from one to two thirds less then the large; to have a cogg wheel on the outside of one end of each roller of equal size, or one on the centre roller; on the inside and next to the part, of the same size, or larger which will make the large rollers turn an equal or greater number of times with the small, which motion performs a sliking slikinor [illegible]

to extend smooth, consolidate, and slick the skins or hides, after being properly
prepared, which operation fits or prepares them for splitting. The second set of rollers
or nulls are intended for scouring and washing skins or hides. the nuls or
rollers may be placed in a circular form the small & three or more placed
round it, one under and two at the side of the under and centre all having
a proper bearing on the centre one, forming halfacircle and one placed above
the centre, which are inclosed in a cistern. They may also be placed in a
circle having one placed in the centre then two or more courses round it: to
have a proper bearing on each other. and to one or more of the nuts or rollers
may be attached slickers, or scrapers brush or brushes, or some of the rollers may
be fluted or any other article the opperator may chuse to substitute by de-
taching the slickers scrapers brushes, and so forth from the above, the principle
may be applied to the washing of linen, woolen, or any other pliable substance.
The ends of the rollers may turn on trundles or small rollers or multiplying
wheels or being capedat the ends of the rolers with steel or other mettal or hard
points may turn in sockets of any suitable mettal all of which would re-
duce the friction of necessary. The third set of rollers or nuts are to receive
the articles from the cistern and are to be furnished with slickers or scrapers,
to strike the leather dry, there will be allso a brush, moving from side to side
of the skin or hide, with a quick alternate motion to cleanse and loosen the
same the skins or leather haveing passed through the last process. is then cut
into gaters for men, women, or children, and are cut in one entire piece
or two pieces except the soles, the same to be cramped on a boot tree, made
for that particular purpose either of wood or iron or any substance suitable
for the purpose with a joint in the foot or instep in such a manner, as that
the toe instap or foot shall drop or turn downward untill the leg is placed
on the tree and tacked at the heel and the tree brought to its proper place
again. Or there may be a joint in the ancle the foot split in two parts and
turn up each way, or it may be don by the leg and foot being in two
parts, or it may be don by a moveable piece or pieces of wood, iron or
any other substance suitable placed at the heel and running each or
either way, stretched by screws, keys, axes or wedges after the leather is
tacked thereto, being thus placed smooth on the boottree remain in that situation untill dry then finished into morocco, or other ways and made on
right and left last. Suwarrow legs or any other kind, may by this process be
made into morrocco or other leather finished and formed for the boot maker
in a very superior stile one which will be a security against all manner of
dust originating in the present mode of stretching, cramping & finishing by curriers
and boot makers in the inside of the boots and which generally soils the stockings.
The oiling stuffing and blacking is performed by the under roller of each pre-
-pared by being covered with brushes or woolens knit and stuffed or any other thing
proper to perform the operation. the oil stuffing and blacking are placed under
each receiving roller in a trough or box long enough to receive the rolers to turn
in the same - The leather is incerted through that and the next roler, at the
conclusion of the blacking, there should be a piece of refuse leather, or cloth
follow the skin, to prevent the soiling the upper roler. unless the roler is made
with a spring, or fall to drop the moment the skin leaves the rolers. the stuffing
is prepared by one or more setts of nuts, and rolers placed two to a sett, hori-
-zantoly one sett above the other, to have a proper bearing with each other, side-
-ways, and geared cornerways - the nutts and rolers all turn inwards, from the
Top downwards, receives the stuff at the top, and passeth through the whole
number of setts more or less the under sett, to be the slipping rolers, the others
nutts. under which should be a trough to receive the stuff thus prepared; the
same principal will answer a most valuable purpose, for neading and mix-
-ing of clay for making of bricks Pottery or any other purpose or for working
marter of all kinds or for grinding of apples - The blacking for what is called
waxed leather may have the roler placed a little circular and have a
roler on the side of it to size the leather, as it leaves the blacking roler, hav-
-ing the leather come through blacked and sized; or the blacking may be
mixed with sizeing, omitting the extra roler above, the opperation being performed
at once passing. the stripping is performed by the under roler being covered
with strips of woolen, hatt or cloth, or any other thing suitable for the work
placed in strips as wide as the stripe is to be, and they as wide as the stripe. -
it may also be performed, by a board as large as the skin being covered with
the stripes as before mentioned, and pressed on the skin. stamping and
printing as performed by two or more rolers [illegible]

rolers shall be made of iron, steel, brass, copper, or any hard mitterial, on which shall be carved or engraved, such figure or figures as are intended to be im-pressed on the leather, or it may be performed by taking one roler with the desired figure or figures and use the same by hand or any other force. The sticking may be performed by rolers placed the same as the first, the size, proportions, and movement the same as the first, one of which shall be suita-bly covered, for rubbing the leather out before and after blacking. The polishing glazing and finishing may be performed by rolers the number proportion and movement the same, as the first mentioned but much smaller, will stand in an horizontal direction, the small one in the middle the large one to be made of iron, steel, brass, composition, wood or any hard material to be turned with threads, the whole length of the roler, or any part or parts of it, it may also be performed by a table being placed on rolers horizontally or angularly. the leather placed on the table and the table moving forwards & backwards on the rolers: while the polishers, or stickers move from side to side, crossing the table. The splitting is performed by two or more knives the length according to the number, the greater the number, the less the friction made in an oval or in the form of a half moon sett in a frame, carriage or block, in sockets of iron or some hard material if more than two place them as near each other as can be and follow in direct course after each other, standing a little bevel from the leather placed. in the center of the frame carriage or block to move horizontally in grooves or through morties and cut each way or in a bevel or angle direction, to cut but one way. or the knives may be sett to cut but one way, the frame, carriage or block moaving horizontally, bevel or angle ways the leather is moaved or drawn by two nuts or roler placed so near the knives as possible passing by a beam which governs the thickness, by being moved to any gage desired there confined by keys, screws, or wedges, the leather kept close to the beam by a spring which comes close up to the knives they moveing by the side of the beam splits and divides the leather as it passes, the grain side goes through the nuts or roolers, the other part falls down by the side and over the spring, the leather thus divided in many cases is worth nearly or quite as much the part split off as the grain side which has heretofore been quite lost in useless shavings. it may also be performed by passing between
two rolers, placed instead of the beam and spring splitting the leather as it
passes through the roler next to the nut to govern the thickness by moving it
nearer to or further from the knives. the leather extending underneath the
roler by two other rolers, the splitting knives are set in operation by a shaft
moved by a polisher or finisher which is set in operation by a shaft moved
by a crank on which is a lanthorn or cogg wheel which gives motion to a large
wheel and setts the whole machine in opperation in whole or part only by
shifting the bandage. or it may be done by cogg wheels instead of bandages
the power which setts the whole of the rolers and other works in motion may
be either. water. steam. — wind horse or cattle by hand or any other force
sufficient for the work. The utility and superiority of my method of curry-
-ing and finishing leather of all kinds consists in the construction of the ma-
-chine which may all be kept working at the same time doing every part
of the business at once or any one part seperately without the trouble of con-
-tinually cleaning the tables thus time is saved, labour is saved and the in-
-gredients are saved and the leather made better in quallity & the part split
of from the skin equally as valuable as what was usually saved by the
old method. another valuable consideration is that gators and boots can be
made actually into morocco after the legs are cut, cramped, and straine[illegible]
and shaped ready for the workmen to sew at. June 27th. 1808 —
Signed in presence of
William Thornton
Ezra Varden Samuel Parker District of Columbia. City of Washington 25th. June 1808 then personally ap-
-peared Samuel Parker Esquire, of Bellerica in the County of Middlesex
state of Massachusetts, above named, and made solemn oath that he verily
believes that he is the true & original inventor or discoverer of the art or im-
-provement above specified and referred to, for which he solicits a patent
before me —

William Thornton

Enrd
[illegible]